(12) United States Patent
Chamberlain et al.

(10) Patent No.: US 8,555,609 B1
(45) Date of Patent: Oct. 15, 2013

(54) CHAIN TOOL

(75) Inventors: Jason L. Chamberlain, Morgan Hill, CA (US); Colin Alexander Davis Daw, Saratoga, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 13/440,872

(22) Filed: Apr. 5, 2012

(51) Int. Cl.
*B25B 13/00* (2006.01)
*B21L 21/00* (2006.01)

(52) U.S. Cl.
USPC .................................................. 59/7; 7/138

(58) Field of Classification Search
USPC .................... 59/7, 9, 11; 7/138, 165
See application file for complete search history.

(56) References Cited

U.S. PATENT DOCUMENTS

| | | | |
|---|---|---|---|
| 2,747,362 A * | 5/1956 | Cox | 59/7 |
| 4,967,435 A | 11/1990 | Seals | |
| 5,251,341 A | 10/1993 | Seals | |
| 5,357,643 A | 10/1994 | Seals | |
| 5,950,498 A | 9/1999 | Gossett et al. | |
| 6,564,982 B1 | 5/2003 | Woods et al. | |
| 6,916,106 B2 | 7/2005 | Xingguo | |
| 8,136,338 B2 * | 3/2012 | Huang | 59/7 |
| 2009/0258742 A1 * | 10/2009 | Valle et al. | 59/7 |
| 2011/0061360 A1 | 3/2011 | Huang | |
| 2011/0179761 A1 | 7/2011 | Yu | |
| 2012/0000313 A1 | 1/2012 | Zacks | |

OTHER PUBLICATIONS

Cannondale Headwrench, http://www.sicklines.com/2006/09/03/cannondale-headwrench/, Sep. 3, 2006.
Cannondale Head Wrench Multi Tool—7A506/BLK, http://www.cannondaleexperts.com/cannondale-head-wrench-multi-tool—7a506blk-p-38.html, (retrieved on Jun. 5, 2012), product sold to public at least by 2007.

\* cited by examiner

*Primary Examiner* — David B Jones
(74) *Attorney, Agent, or Firm* — Knobbe Martens Olson & Bear LLP

(57) ABSTRACT

A chain tool can be used to assemble or disassemble links on a chain, in particular a bicycle chain. The chain tool can be shaped and sized to be received within a component of a bicycle. For example, the chain tool can be received into a steerer tube at the head tube of the bicycle. The chain tool can also serve as a part of a headset, such as being a top cap of the headset.

23 Claims, 10 Drawing Sheets

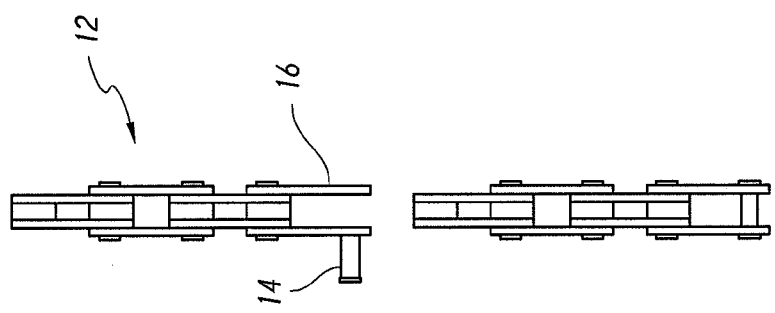
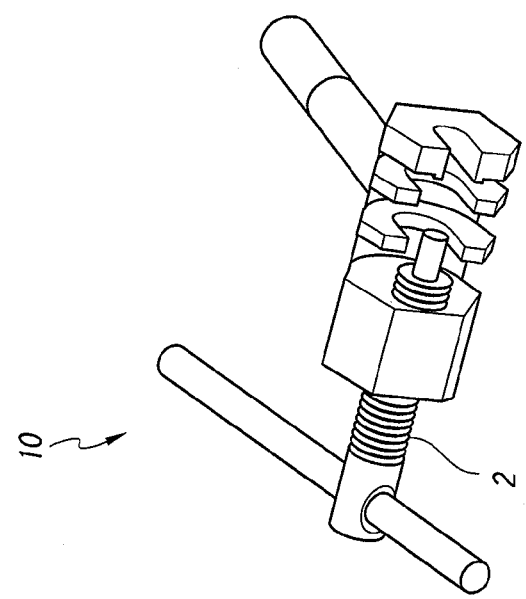
FIG. 1
Prior Art

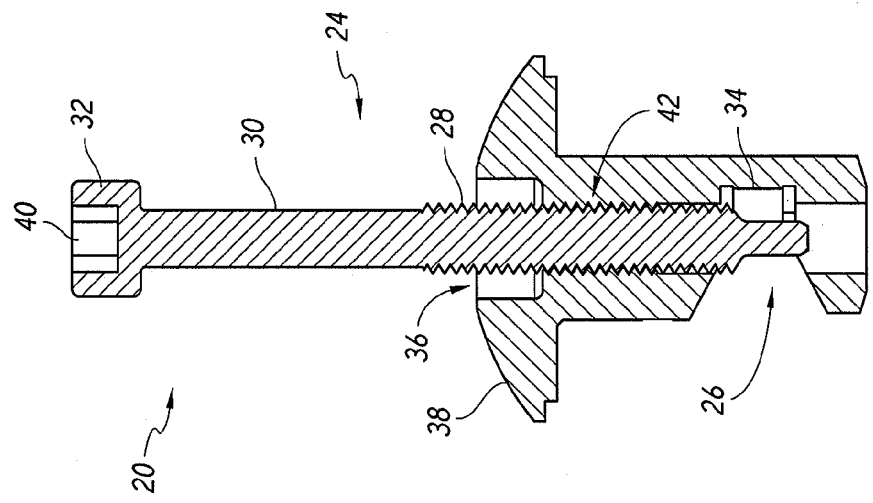
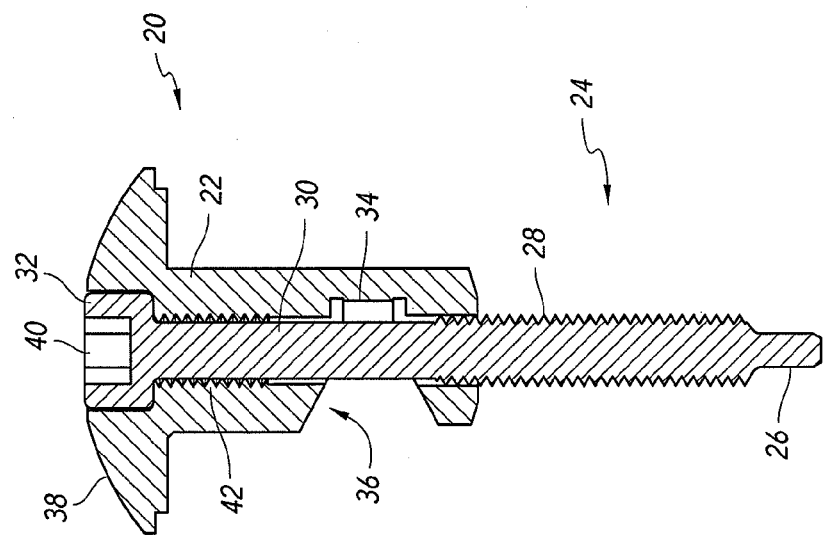

CHAIN TOOL

BACKGROUND OF THE INVENTION

1. Field of the Invention

The present invention generally relates to chain tools and more particularly to bicycle chain tools.

2. Description of the Related Art

A chain tool is a tool used to assemble or disassemble links on a chain, in particular a bicycle chain. FIG. 1 illustrates a common prior art chain tool 10 and a bicycle chain 12. There are many different types of bicycle chains and bands, but the most common involve a series of links made up of pins 14 and plates 16. The pins 14 can be pushed out with the chain tool to break the bicycle chain. Conversely, the chain tool can also be used to push a pin into the plate to reconnect a broken chain. The chain tool 10 includes a threaded shaft 2 that can be used to advance the pin in the chain either into the chain or out of the chain, thereby connecting or disconnecting a link. Because the pins are pushed out gradually with the threaded shaft 2, they can be partially removed or fully removed, depending upon the intention of the user.

The chain 12 in FIG. 1 is shown with a pin 14 that has been forced out of one plate to the point where it almost completely removed from the chain. In this position, the chain tool 10 can be used to easily reconnect the chain, pushing the pin 14 back into the chain and connecting the disconnected links.

SUMMARY OF THE INVENTION

It can be very useful for a cyclist to carry a chain tool with him/her when riding. Generally speaking, if one's bicycle chain brakes, a chain tool may provide a quick fix. Alternatively, the unfortunate cyclist without a chain tool may have to wait for a friend to come pick him/her up, or walk home pushing the bike.

Accordingly, there exists a continuing need for easy to use and easy to carry chain tools. In some embodiments, a chain tool can be shaped and sized to be received within a component of a bicycle for ease of storage and to ensure the tool will be available when needed. For example, the chain tool can be received into a steerer tube of the bicycle at the head tube and can be used as a part of a headset.

In some embodiments, a chain tool comprises a main body and a shaft. The main body can have a cavity extending through the main body and establishing a longitudinal axis. The main body can also have a main portion, a top portion adjacent the main portion and a channel in the main portion for receiving a link of a bicycle chain. The top portion can comprise a lip that extends radially outward from the longitudinal axis and from the main portion, the top portion shaped and sized to form a top cap of a headset with the lip configured to engage a stem or a spacer on a bicycle. The cavity can extend from a first opening at the top portion, through the both the top portion and the main portion to a second opening at the channel in the main portion. The shaft can be received into and movable within the cavity of the main body. The shaft can comprise a threaded section and a pin, the pin located on one end of the shaft and configured to contact and engage a chain pin of the link of the bicycle chain.

In some embodiments the shaft comprises a head and a stem, the head comprising a socket configured to receive a tool. The head can fits within the top portion of the main body and may provide a substantially flush top surface between the head and the top portion. The shaft may have an unthreaded section positioned between the head and the threaded section.

In some embodiments the chain tool is part of an assembly. The assembly can also include a star nut or expanding wedge, and/or a bicycle having the stem, wherein the top portion engages the stem.

According to some embodiments a chain tool, which may be part of an assembly, comprises a main body and shaft. The main body having a cavity extending through the main body and establishing a longitudinal axis, the cavity having a threaded cavity portion. The main body also having a main portion, a top portion adjacent the main portion and a channel in the main portion for receiving a link of a bicycle chain. The top portion can form a head, the main portion forming a stem having an outer dimension less than the top portion. The cavity can extend through both the head and the stem and opening at the channel. The shaft can be received into and movable within the cavity of the main body, the shaft comprising a threaded section, an unthreaded section, and a pin. The pin can be located on one end of the shaft and configured be to contact and engage a chain pin of the link of the bicycle chain. The shaft can have a first position wherein the shaft threaded section is configured to engage the threaded cavity portion and a second position wherein the unthreaded section is positioned within the threaded cavity portion such that the shaft threaded section extends past and away from the main body.

In some embodiments, the chain tool can further comprise one or more of a foldable handle, a master link having a pair of plates received into the main body, and a cap for covering the master link and the top portion.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

FIG. 1 shows a prior art chain tool and bicycle chain.

FIG. 3A is a cross-sectional view of the chain tool of FIG. 2 in a first position.

FIG. 3B is a cross-sectional view of the chain tool of FIG. 2 in a second position.

DETAILED DESCRIPTION OF THE PREFERRED EMBODIMENT

Figure 2B:
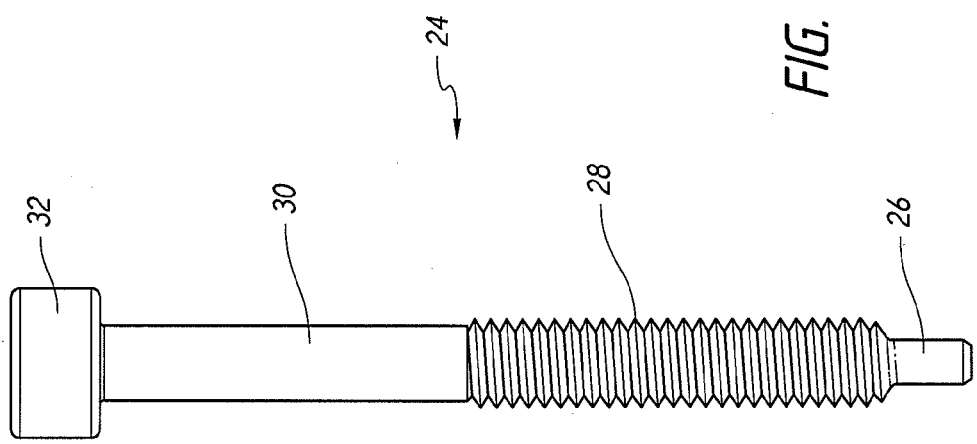
FIG. 2 is a chain tool according to certain embodiments.
Figure 2A:
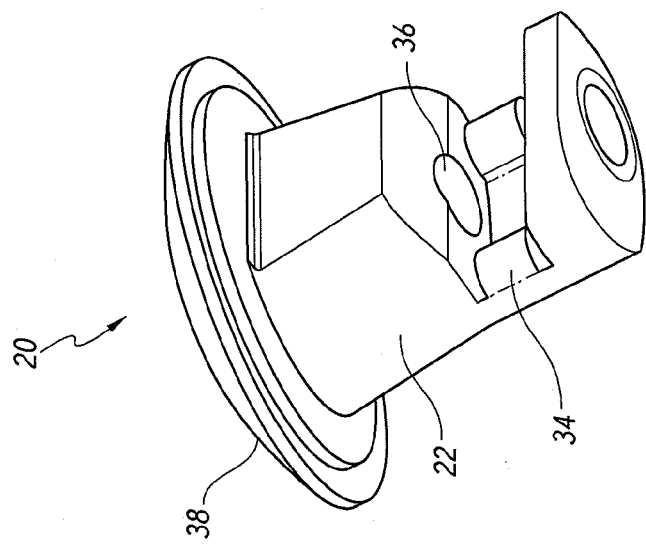

As has been mentioned, a chain tool is a tool used to assemble or disassemble links on a chain, in particular a bicycle chain. FIGS. 2, 3A and 3B show one embodiment of a chain tool 20 including a main body 22 and a shaft 24. The main body includes a channel 34 into which a bicycle chain can be placed. The shaft 24 can be positioned with the cavity 36 and advanced or retracted from the cavity 36 to thereby break or connect the links on the bicycle chain.

The shaft 24 can include a threaded section 28 and the cavity 36 can also include a corresponding threaded portion 42. This can allow the shaft to move within the chain tool in a controlled manner to apply a force on a pin of a bicycle chain link. The shaft can also include a shaft pin 26. The shaft pin 26 can engage a pin on the chain to break or connect the links on the bicycle chain. The shaft pin 26 can be positioned on one end of the shaft 24 and can be sized to engage a pin of the bicycle chain link. The shaft pin 26 needs to be small enough to fit within the holes on the plates wherein the pin is positioned on the bicycle chain. Thus, in some embodiments, the shaft pin 26 has a smaller diameter than other parts of the shaft 24. The shaft pin 26 is slightly narrower than the pin, so that it can press the pin through the link. The shaft pin 26 can also be a removable piece which can be replaced when worn.

The shaft 24 can also include a head 32. As shown, the head 32 includes a socket 40 to receive a tool, such as a hex key or Allen wrench. In some embodiments, the socket 40 can be sized and configured to use a tool commonly used with other components on the bicycle. For example, hex keys are commonly carried by many cyclists as many components of a bicycle use bolts with a hex socket. The shaft 24 can use one of these common hex socket sizes so that the chain tool can be more compact while utilizing common tools carried by a user. The shaft 24 is also illustrated with an unthreaded section 30 that will be discussed in more detail below. Various different styles and designs of shafts can be used. For example, though the shaft 24 is shown with a head 32 having a socket 40, other designs can be used, such as an integral arm that extends out the side such that a socket is not necessary.

The chain tool 20 can also be configured for storage in a component of a bicycle. For example, the chain tool could be stored within a steerer tube at the head tube or other open cavity on the bicycle. In addition, the chain tool 20 can function as a part of a component system on the bicycle. For example, the chain tool 20 can be part of a headset, such as a top cap of a headset.

Figure 4:
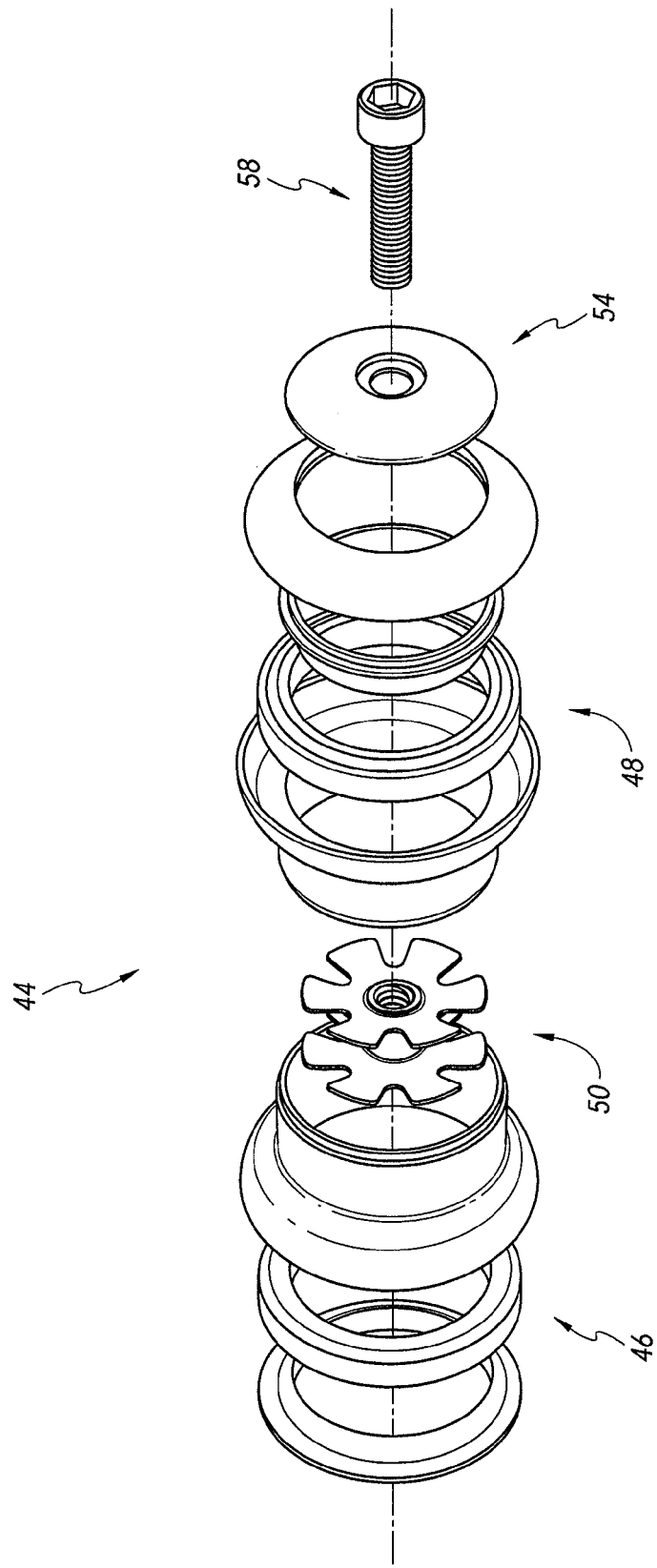
FIG. 4 shows an exploded view of a headset.
Figure 5B:
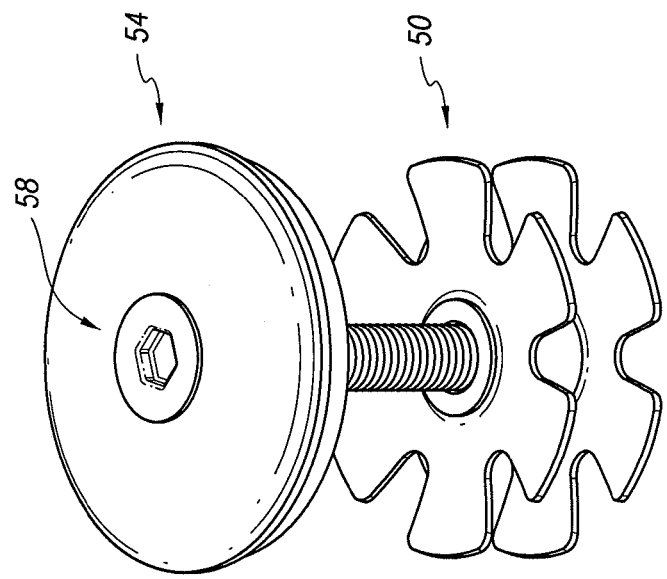
FIG. 5B shows a star nut, a top cap, and a screw.
Figure 5A:
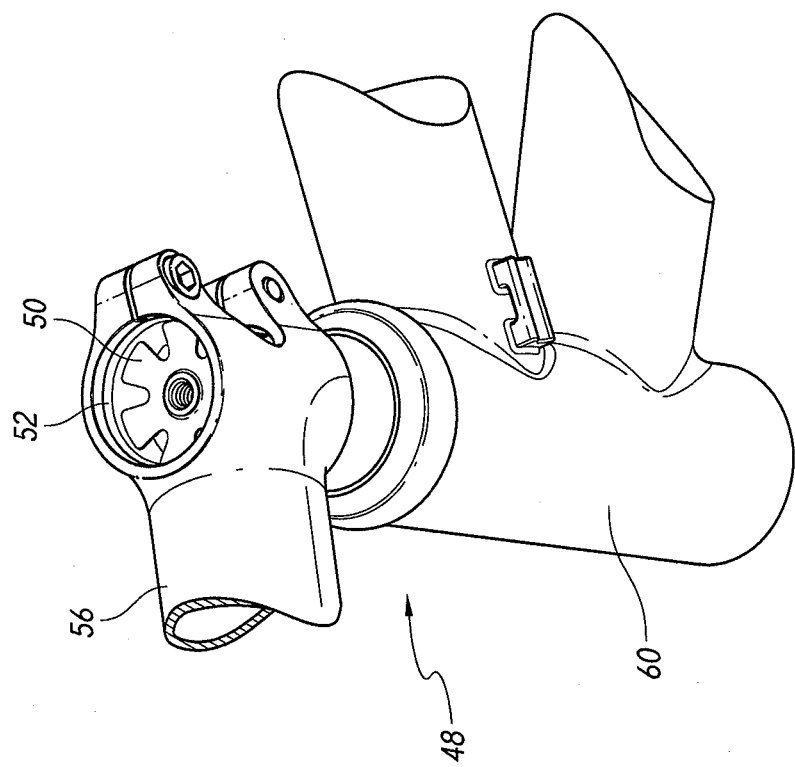
FIG. 5A illustrates part of a bicycle including part of the stem and head tube.

FIG. 4 illustrates one example of a headset 44. A headset 44 can help ensure easy and proper movement between various components of the bicycle, among other benefits. In particular, a headset 44 can include bearings or bushings 46, 48 positioned at the interface between the head tube of the bicycle frame and the steerer tube. Generally, a first bearing assembly 46 will be located at the bottom of the head tube and a second bearing assembly 48 will be located at the top of the head tube 60 (FIG. 5A). The steerer tube 52 can be part of the fork and be connected to a wheel at one end and handlebars, generally through a stem 56, at the other end. Thus, the headset helps maintain repeatable, reliable steering of the bicycle.

Figure 6:
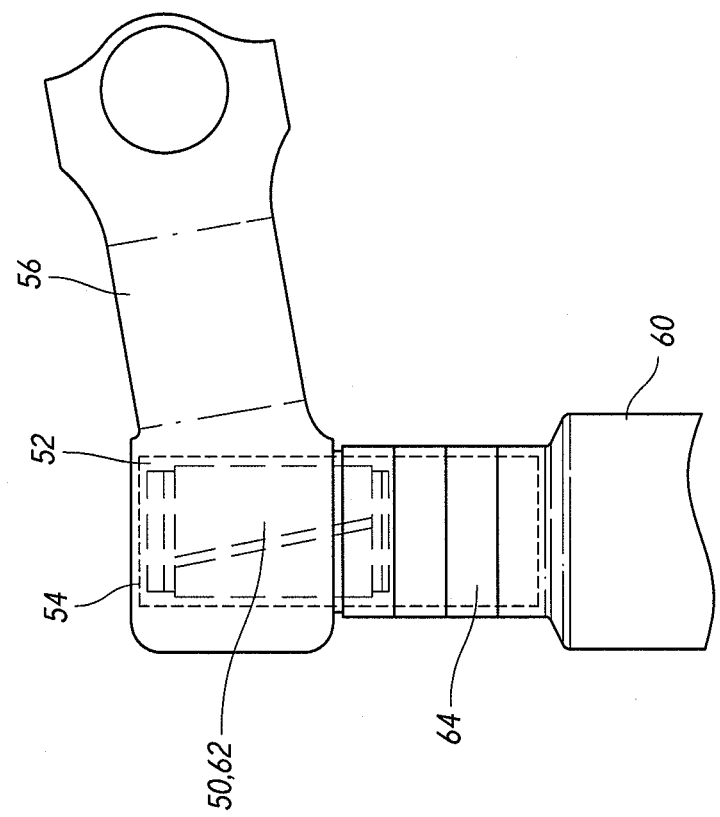
FIG. 6 is a side view of an expanding wedge within a steerer tube.

The headset 44 generally also includes a securement feature 50 which secures the headset, but also the steerer tube 52 within the head tube 60. FIGS. 4, 5A and 5B illustrate one embodiment of a securement feature in the form of a star nut 50. The star nut 50 in FIG. 5A is positioned and secured within the steerer tube 52. A top cap 54 can then be placed on the stem 56, or a spacer and a screw 58 can be threaded into the star nut 50 through the top cap 54, similar to the orientation shown in FIG. 5B. The top cap 54 can engage the stem 56 or spacer in such as way to keep the assembly together. One other example of a securement feature 50 is an expanding wedge 62, often used with a carbon steerer tube 52 as shown in FIG. 6. FIG. 6 also illustrates the head tube 60, spacers 64 and the stem 56.

Figure 7:
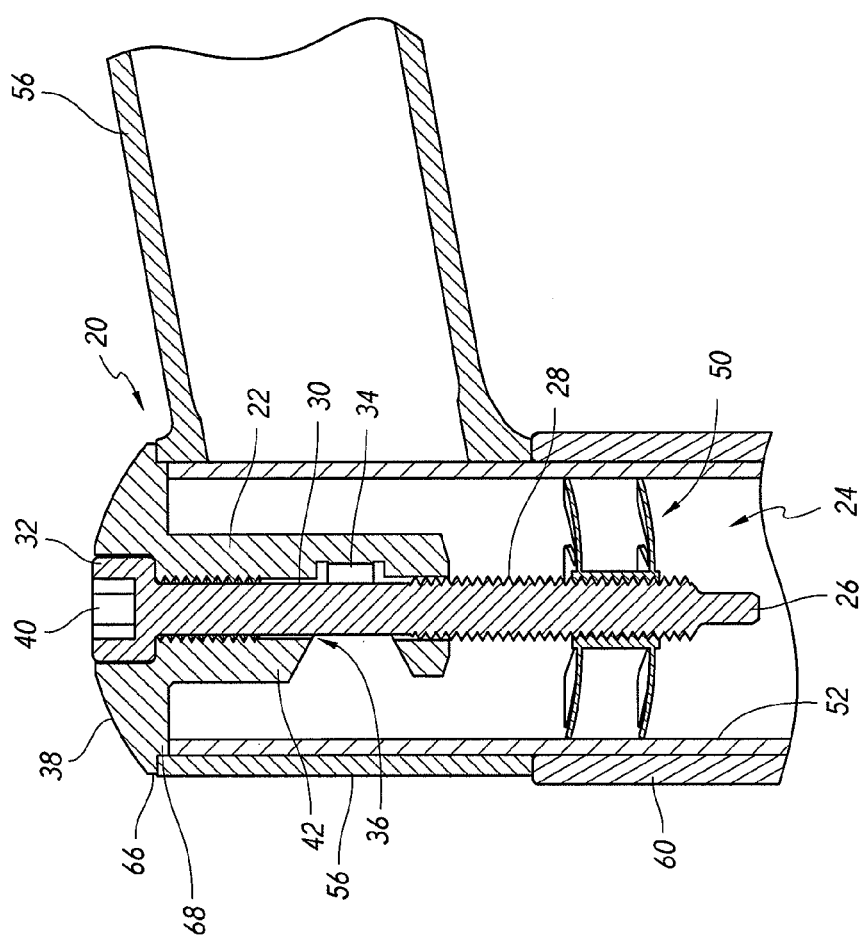
FIG. 7 shows a chain tool positioned within a steerer tube.

Turning now to FIG. 7, the chain tool 20 can be seen within the steerer tube 52. It can be seen that the top portion 38 of the chain tool 20 can be shaped to function in the same way as the top cap of the headset. This design incorporates the chain tool into the headset top cap. The chain tool can be a part of a headset, including a top cap. Thus, the chain tool can be used in place of the original top cap, such as being an after market accessory, or it can be the original top cap of the headset. The top cap is generally used to pre-load the headset. After the headset is assembled on the bicycle and preloaded, the bolts on the stem 56 are tightened against the steerer tube 52. The top cap can then be removed without affecting the preload or strength of the assembly. Though, at the same time, it is generally desirable to keep the top cap in place for other reasons, such as aesthetics, and to prevent dirt or other debris from entering the steerer tube. In this way, the steerer tube provides an ideal location for storage of the chain tool, while also serving as the top cap.

The top portion 38 can form a lip 66 that extends radially outward from the rest of the body. The lip 66 can be used to engage the stem 56 or spacer on the bicycle. The top portion 38 may also include a secondary lip 68. The secondary lip can extend radially outward from the main portion 22, but the secondary lip 68 can be spaced from the lip 66 to not extend as far. This can serve to center the chain tool 20 within a hole in the stem 56 or spacer. The difference in space between the lip 66 and the secondary lip 68 can be an indention or rabbited edge that extends around all (i.e. 360 degrees), or around part of the top portion 38.

It can also be seen that the unthreaded section 30 of the shaft 24 can be within the threaded section 42 of the cavity 36. At the same time, the threaded section 28 of the shaft 24 can be engaged with the start nut 50, or other securement feature, such as an expanding wedge. Having a threaded 28 and unthreaded 30 section of the shaft 24 can allow that shaft to be positioned more quickly and also allow for a quicker transition between storage and use as a head cap and use as a chain tool. Thus, it will be understood that the chain can have a first position, as illustrated in FIG. 7, and a second position as illustrated in FIG. 3B. In some embodiments, the entire shaft is threaded or it is substantially entirely threaded, though the shaft pin 26 may remain unthreaded.

In addition, the shaft 24 can be longer than the main body 22. The shaft may be substantially longer, such as twice as long or longer, than the main body. In other embodiments, the shaft and main body can be closer in length, or the shaft may even be shorter than the main body. For example, the shaft can be received within a recess of the main body such that even if it is shorter, it still extends past the main body to attach to a securement feature.

As shown, with the shaft 24 attached to the securement feature 50 and being within the steerer tube 52, the head 32 of the shaft can be substantially flush with the top portion 38. As illustrated, the top portion is dome shaped, though it will be understood that any number of shapes and designs can be used, including planar and disk shaped.

Figure 8B:
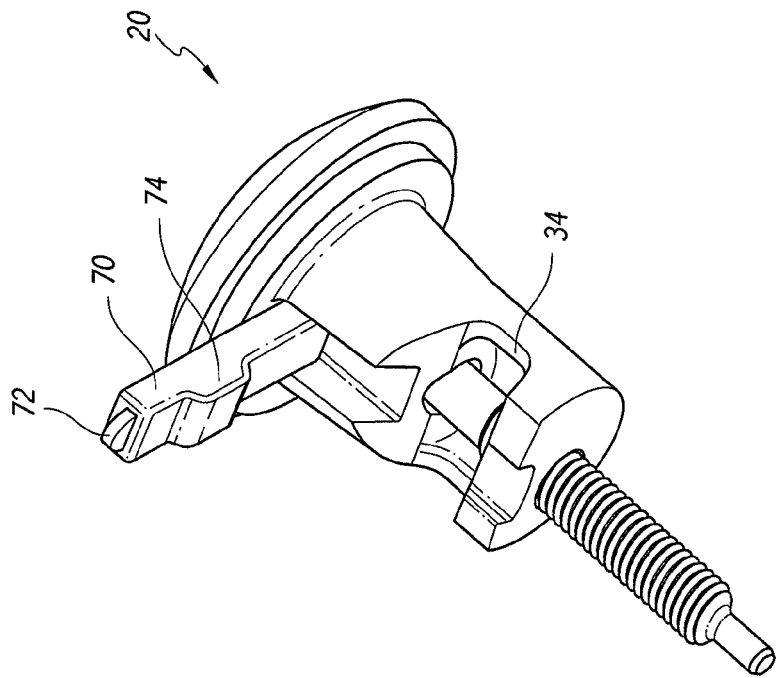
FIGS. 8A and 8B illustrate another embodiment of chain tool.
Figure 8A:
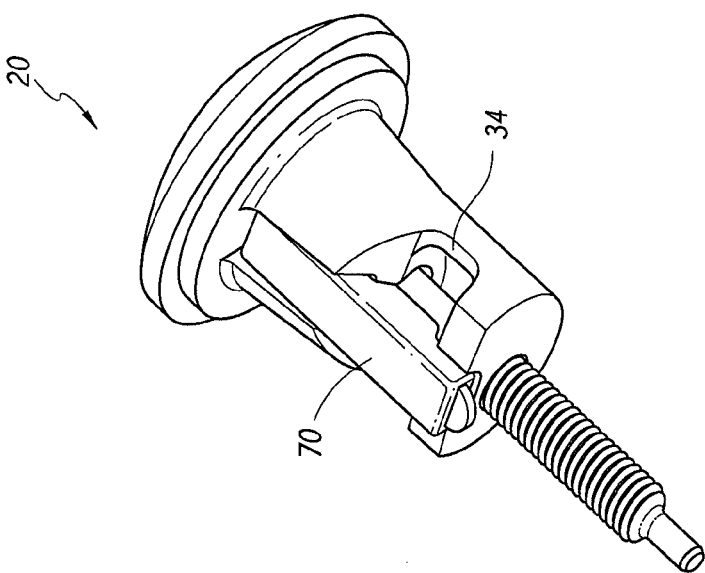

Looking now to FIGS. 8A and 8B, another embodiment of the chain tool 20 is illustrated. In the illustrated embodiment a handle 70 is shown. The handle 70 can be hinged to rotate outward. This arm allows the user to hold the tool with greater leverage and to prevent the chain tool from rotating in hand when torque is applied to the screw and pin. There are however many possibilities for resisting torque when holding the chain tool and this is merely one solution. The handle 70 may also include a protrusion 72 that serves as a "nail nick" for opening the handle or lever 70. In some embodiment the protrusion can also serve as a button lock 72. The button lock 72 can be pressed to unlock the handle from one position to move the handle to a secondary position. The button lock 72 may require pressing to move the handle between both of or only one of the folded and extended positions. The handle 70 can also include grip features 74. The grip features according to some embodiments can comprise a ridge that extends outwardly. In the illustrated embodiment, the grip feature 74 extends outwardly into the channel 34, when the handle is in the folded position.

Other systems and methods of resisting torque when holding the chain tool can also be used. For example, instead of a folding handle, the chain tool could include a receptacle in the body to receive a separate tool or handle. The chain tool can include a removable handle received in the body in a first position, similar to the position of the foldable handle 70 shown in FIG. 8A. The handle can be removed from the storage position and then be reconnected in a different orientation, and/or at a different location, similar to the position of the foldable handle 70 shown in FIG. 8B. The handle could also be separately stored during non-use. Alternatively, a receptacle on the chain tool could receive a tool, such as an Allen wrench, or screw driver. A receptacle or other feature on the chain tool could connect to a tire lever or other tool. In another embodiment, the chain tool can include wrench flats on its surface to be held by a fixed or adjustable wrench.

Another feature of some embodiments of the chain tool 20 is that it may include a set of quick links or master links. Quick links are specially designed chain links which can be used to reconnect the chain without the use of a chain tool. Quick links may allow repeated making and breaking of a chain and can be connected by hand pressure but often need a pair of needle-nosed pliers or a special tool for removal. There are many different styles and designs of quick links, thus, though one style is show, it will be understood that other variations could also to be used.

Figure 11:
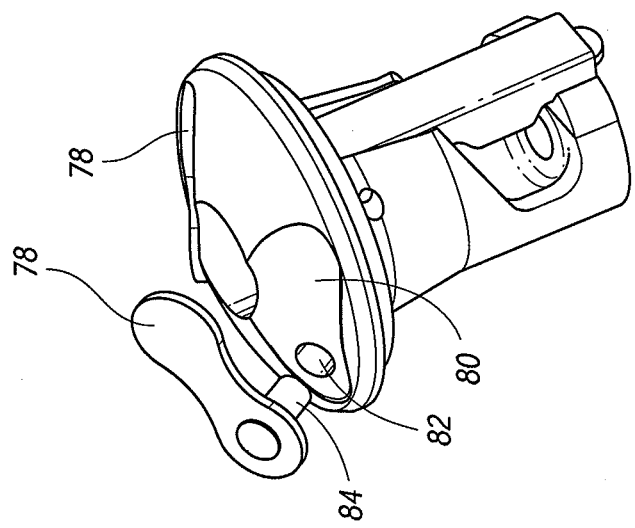
FIGS. 9-11 show an embodiment of a chain tool including a master link.
Figure 10:
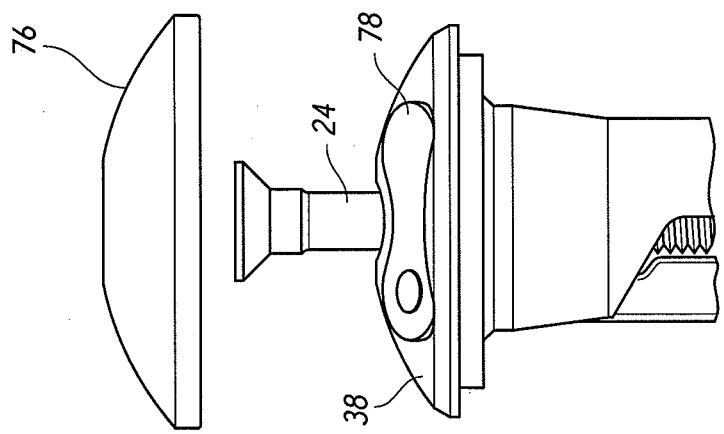
Figure 9:
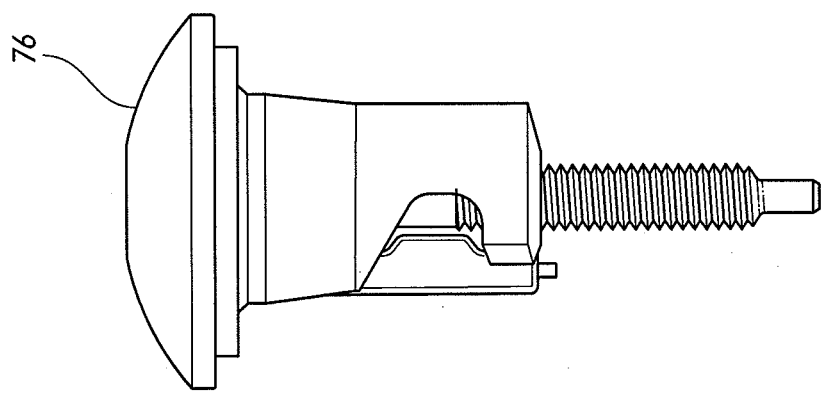

Looking now to FIGS. 9-11, one system for storing a set of quick links will be discussed. The chain tool 20 can include a cap 76. The cap 76 can cover the top portion, including a set of quick links. The cap 76 may cover the shaft 24, or may include a hole and be held onto the chain tool by the shaft 24. In some embodiments, the cap 76 is held on by friction fit, threads, or other features.

The cap 76 can cover two quick links as shown. The top portion 38 can include dedicated spaces 80 for the quick links 78. The dedicated spaces 80 can be recessed to receive the quick link 78 and allow the quick link to stay within the top portion. The dedicated space 80 may also include a hole 82 into which a pin 84 on the quick link 78 can fit.

Figure 14:
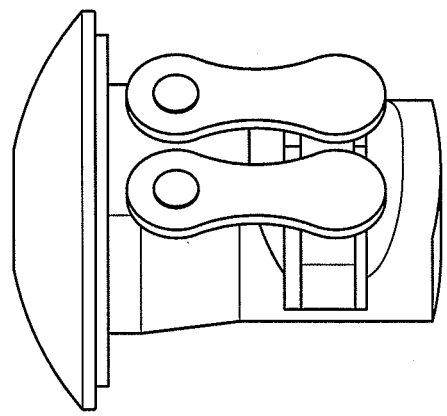
FIGS. 12-14 show additional embodiments of chain tools including a master link.
Figure 13:
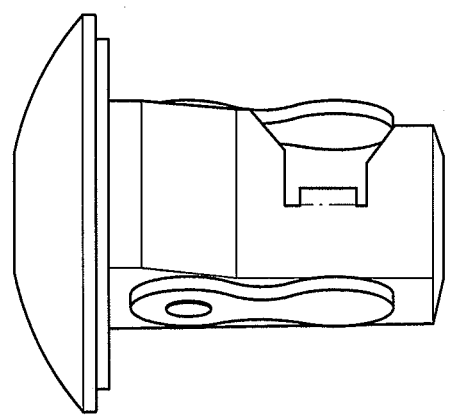
Figure 12:
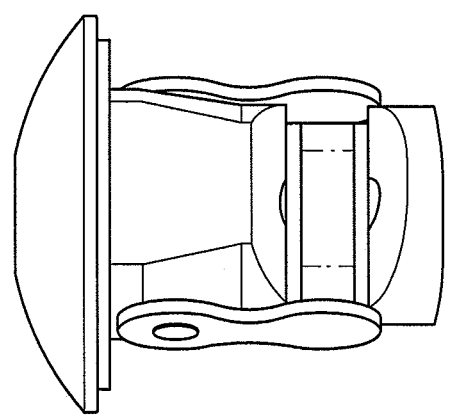

FIGS. 12-14 illustrate additional possible storage locations for the quick links. The quick links 78 can be positioned on the same side, opposite sides, different sides of the main body 22. The dedicated spaces can simply include a hole to receive the pin on the quick link, or it may include contouring or additional features to help the quick links remain connected to the chain tool.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. An assembly comprising:
 a chain tool, comprising:
  a main body having:
   a cavity extending through the main body and establishing a longitudinal axis;
   a main portion;
   a top portion adjacent the main portion, the top portion comprising a lip that extends radially outward from the longitudinal axis and from the main portion, the top portion shaped and sized to form a top cap of a headset with the lip configured to engage a stem or a spacer on a bicycle; and
   a channel in the main portion for receiving a link of a bicycle chain,
   wherein the cavity extends from a first opening at the top portion, through the both the top portion and the main portion to a second opening at the channel in the main portion; and
  a shaft received into and movable within the cavity of the main body, the shaft comprising a threaded section and a pin, the pin located on one end of the shaft and configured to contact and engage a chain pin of the link of the bicycle chain.

2. The assembly of claim 1, wherein the shaft comprises a head and a stem, the head comprising a socket configured to receive a tool.

3. The assembly of claim 2, wherein the socket comprises a hex socket.

4. The assembly of claim 2, wherein the head fits within the top portion of the main body.

5. The assembly of claim 4, wherein the head fits within the main body and provides a substantially flush top surface between the head and the top portion.

6. The assembly of claim 2, wherein the shaft further comprises an unthreaded section positioned between the head and the threaded section.

7. The assembly of claim 6, wherein the pin has a diameter less than the diameter of the threaded section and being on the end of the shaft opposite the head.

8. The assembly of claim 1, wherein the main body further comprises a foldable handle.

9. The assembly of claim 1, wherein the lip extends 360 degrees around the main portion.

10. The assembly of claim 1, wherein the shaft is longer than the main body.

11. The assembly of claim 1, further comprising a star nut or expanding wedge wherein the shaft engages the star nut or expanding wedge.

12. The assembly of claim 11, further comprising a bicycle having the stem, wherein the top portion engages the stem.

13. An assembly comprising:
chain tool, comprising:
a main body having:
a cavity extending through the main body and establishing a longitudinal axis, the cavity having a threaded cavity portion;
a main portion;
a top portion adjacent the main portion and forming a head, the main portion forming a stem having an outer dimension less than the top portion; and
a channel in the main portion for receiving a link of a bicycle chain, the cavity extending through both the head and the stem and opening at the channel; and
a shaft received into and movable within the cavity of the main body, the shaft comprising a threaded section, an unthreaded section, and a pin, the pin located on one end of the shaft and configured to contact and engage a chain pin of the link of the bicycle chain, the threaded section positioned between the unthreaded section and the pin,
the shaft having a first position wherein the shaft threaded section is configured to engage the threaded cavity portion and a second position wherein when the unthreaded section is positioned within the threaded cavity portion the shaft threaded section is positioned outside of the threaded cavity portion.

14. The assembly of claim 13, wherein the shaft comprises a shaft head and a shaft stem, the shaft head comprising a socket configured to receive a tool.

15. The assembly of claim 13, wherein the pin having a diameter less than the diameter of the threaded section.

16. The assembly of claim 13, wherein the main body further comprises a foldable handle.

17. The assembly of claim 13, further comprising a master link having a pair of plates received into the main body.

18. The assembly of claim 17, further comprising a cap for covering the master link and the top portion.

19. An assembly comprising:
chain tool, comprising:
a main body having:
a cavity extending through the main body and establishing a longitudinal axis, the cavity having a threaded cavity portion;
a main portion;
a top portion adjacent the main portion and forming a head, the main portion forming a stem having an outer dimension less than the top portion; and
a channel in the main portion for receiving a link of a bicycle chain, the cavity extending through both the head and the stem and opening at the channel; and
a shaft received into and movable within the cavity of the main body, the shaft comprising a threaded section, an unthreaded section, and a pin, the pin located on one end of the shaft and configured to contact and engage a chain pin of the link of the bicycle chain, the shaft having a first position wherein the shaft threaded section is configured to engage the threaded cavity portion and a second position wherein the unthreaded section is positioned within the threaded cavity portion such that the shaft threaded section extends past and away from the main body;
wherein the shaft further comprises a shaft head and a shaft stem, the shaft head comprising a socket configured to receive a tool.

20. The assembly of claim 19, wherein the pin having a diameter less than the diameter of the threaded section.

21. An assembly comprising:
chain tool, comprising:
a main body having:
a cavity extending through the main body and establishing a longitudinal axis, the cavity having a threaded cavity portion;
a main portion;
a top portion adjacent the main portion and forming a head, the main portion forming a stem having an outer dimension less than the top portion;
a channel in the main portion for receiving a link of a bicycle chain, the cavity extending through both the head and the stem and opening at the channel; and
a foldable handle; and
a shaft received into and movable within the cavity of the main body, the shaft comprising a threaded section, an unthreaded section, and a pin, the pin located on one end of the shaft and configured to contact and engage a chain pin of the link of the bicycle chain, the shaft having a first position wherein the shaft threaded section is configured to engage the threaded cavity portion and a second position wherein the unthreaded section is positioned within the threaded cavity portion such that the shaft threaded section extends past and away from the main body.

22. An assembly comprising:
chain tool, comprising:
a main body having:
a cavity extending through the main body and establishing a longitudinal axis, the cavity having a threaded cavity portion;
a main portion;
a top portion adjacent the main portion and forming a head, the main portion forming a stem having an outer dimension less than the top portion; and
a channel in the main portion for receiving a link of a bicycle chain, the cavity extending through both the head and the stem and opening at the channel;
a shaft received into and movable within the cavity of the main body, the shaft comprising a threaded section, an unthreaded section, and a pin, the pin located on one end of the shaft and configured to contact and engage a chain pin of the link of the bicycle chain, the shaft having a first position wherein the shaft threaded section is configured to engage the threaded cavity portion and a second position wherein the unthreaded section is positioned within the threaded cavity portion such that the shaft threaded section extends past and away from the main body; and
a master link having a pair of plates received into the main body.

23. The assembly of claim 22, further comprising a cap for covering the master link and the top portion.

* * * * *